(12) United States Patent
Spannbauer et al.

(10) Patent No.: US 11,821,392 B2
(45) Date of Patent: Nov. 21, 2023

(54) METHOD AND SYSTEM FOR RADIATOR FAN OPERATION FOR CHARGE AIR COOLER ICE ELIMINATION

(71) Applicant: Ford Global Technologies, LLC, Dearborn, MI (US)

(72) Inventors: Shawn Spannbauer, Royal Oak, MI (US); Shuya Shark Yamada, Novi, MI (US); Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/455,378

(22) Filed: Nov. 17, 2021

(65) Prior Publication Data
US 2023/0151784 A1    May 18, 2023

(51) Int. Cl.
*F02M 31/02* (2019.01)
*F02M 31/20* (2006.01)
*F01P 5/02* (2006.01)

(52) U.S. Cl.
CPC .............. *F02M 31/02* (2013.01); *F01P 5/02* (2013.01); *F02M 31/20* (2013.01); *F01P 2025/13* (2013.01)

(58) Field of Classification Search
CPC . F02M 31/20; F02M 31/02; F01P 5/02; F01P 2025/13
See application file for complete search history.

(56) References Cited

U.S. PATENT DOCUMENTS

| | | | |
|---|---|---|---|
| 4,327,674 A * | 5/1982 | Takei | F01P 11/14 123/41.12 |
| 6,729,844 B2 * | 5/2004 | Bettencourt | F04D 29/362 416/37 |
| 8,162,086 B2 | 4/2012 | Robinson | |
| 9,605,587 B2 | 3/2017 | Cunningham et al. | |
| 2011/0303472 A1 * | 12/2011 | Robinson | F04D 27/002 180/68.1 |
| 2014/0251239 A1 * | 9/2014 | Richards | F02B 29/0468 123/41.05 |
| 2020/0300153 A1 * | 9/2020 | Kardos | F02B 29/0431 |
| 2021/0372316 A1 * | 12/2021 | Muttepawar | F01P 7/06 |
| 2021/0394586 A1 * | 12/2021 | Hara | B60H 1/3205 |
| 2022/0074338 A1 * | 3/2022 | Patnurkar | F01P 7/08 |

FOREIGN PATENT DOCUMENTS

RU              151932 U1    4/2015

* cited by examiner

*Primary Examiner* — Kevin A Lathers
(74) *Attorney, Agent, or Firm* — Vincent Mastrogiacomo; McCoy Russell LLP

(57) ABSTRACT

Methods and systems are provided for reducing ice formation in a charge air cooler. In one example, a method includes, operating a radiator fan of a vehicle in a first direction to cool an engine of the vehicle, and reversing a direction of rotation of the radiator fan to blow heated air towards a charge air cooler, the charge air cooler arranged proximate a radiator of the vehicle. Operating the radiator fan in a first direction may be based on the engagement of one or more gears of a transmission of the vehicle while operating the radiator fan in the reverse direction may be based on an engine temperature condition, one or more ambient weather conditions, and an engine idle condition.

18 Claims, 5 Drawing Sheets

METHOD AND SYSTEM FOR RADIATOR FAN OPERATION FOR CHARGE AIR COOLER ICE ELIMINATION

FIELD

The present description relates to methods and systems to reduce ice formation in a Charge Air Cooler.

BACKGROUND/SUMMARY

Turbo charged engines utilize a Charge Air Cooler (CAC) to cool compressed air from the turbocharger, before it enters the engine. Ambient air from outside the vehicle flows across the CAC to cool compressed intake air passing through the passages of the CAC. Condensate may form and freeze in the CAC when the ambient air temperature decreases and the intake air cools below the water freezing point. Sources of the condensate may include both ambient humidity and combustion products recirculated through the crankcase ventilation system into the air intake system upstream of the CAC. Condensate may then be drawn into the engine during acceleration (or tip-in) increasing a likelihood of misfire, and in some examples, increasing a likelihood of engine hydrolock.

Other attempts to address ice formation include specialized hardware and/or software actions to increase the temperature of ambient airflow to the CAC. Examples of solutions include active grille shutters or permanent CAC blockers. However, during drive cycles involving prolonged idling in cold environments, such interventions may not sufficiently control CAC condensate freezing.

The inventors herein have recognized potential opportunities using the engine coolant system. In one example, the issues described above may be addressed by a method for a vehicle, comprising: operating a radiator fan of the vehicle in a first direction to cool an engine of the vehicle, and reversing a direction of rotation of the radiator fan to blow heated air to a charge air cooler of the vehicle, the charge air cooler arranged proximate a radiator of the vehicle. In this way, the temperature of the CAC may be increased and the potential for ice formation in the CAC reduced.

The radiator fan operation may be adjusted based on a drive condition and an engine idle condition. In an example, the radiator fan may be operated in the first direction during the engagement of one or more gears of a transmission of the vehicle.

In an example, the first direction of rotation may be maintained so long as the ambient conditions and engine operating conditions are such that engine cooling is desired. Example conditions for maintaining engine cooling may include engine temperature above a threshold and ambient air temperature above a threshold. The direction of rotation of the radiator fan may be reversed for a threshold duration of time in response to an engine idle condition being present for greater than a threshold duration. In this way, the radiator fan operation may be adjusted to maintain engine cooling or CAC warming based on the conditions of the vehicle operation, enhancing engine performance in cold ambient conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for operating an engine coolant radiator fan for charge air cooler (CAC) ice elimination. For example, a method for decreasing ice formation in the CAC may rely on a combination of control logic, electrical components, and air shrouds to blow warm air at the CAC. The radiator fan operation may be adjusted to alternately cool an engine or warm the CAC of a turbo charged engine, such as the turbo charged engine system of FIGS. 1A and 1B. An engine controller may be configured to perform a control routine, such as the routines of FIGS. 2A and 2B, to adjust the radiator fan based on an engine temperature, an ambient temperature, and an engine idle condition. By blowing warm air at the charge air cooler, moisture in the CAC may be minimized and incidence of ice formation in the CAC may be reduced, especially in drive cycles that include extended periods of idle in cold ambient conditions. Reduced ice formation in the CAC may result in fewer incidences of water contaminating engine oil and less likelihood of water entering the intake system through vaporization from the oil, reducing likelihoods of engine misfire and hydrolock. Example radiator fan operations in response to engine temperature, engine speed, and ambient temperature are described with reference to FIG. 3.

Figure 1A:
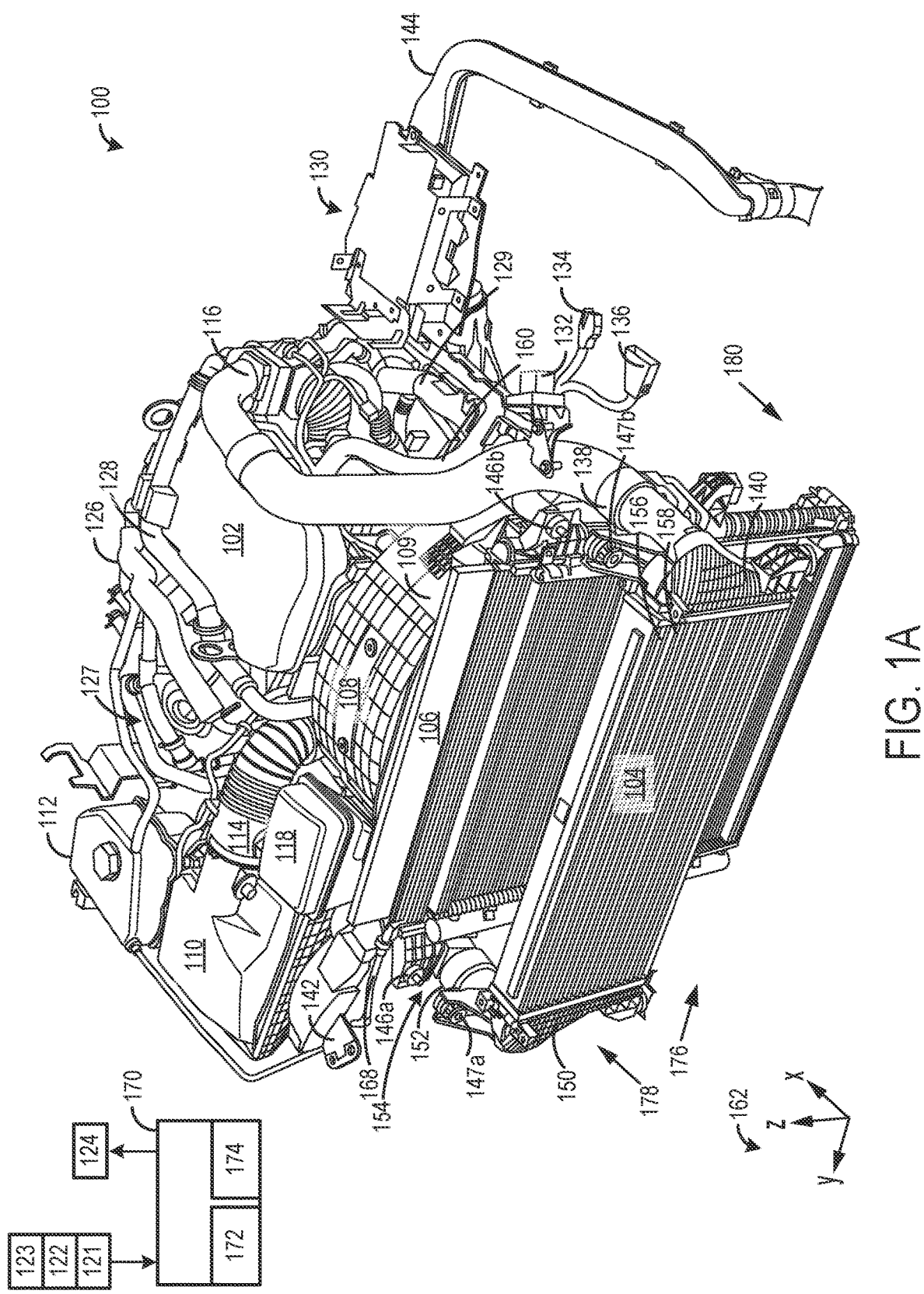
FIG. 1A and FIG. 1B show isometric and perspective views, respectively, of a turbo charged engine system.
Figure 1B:
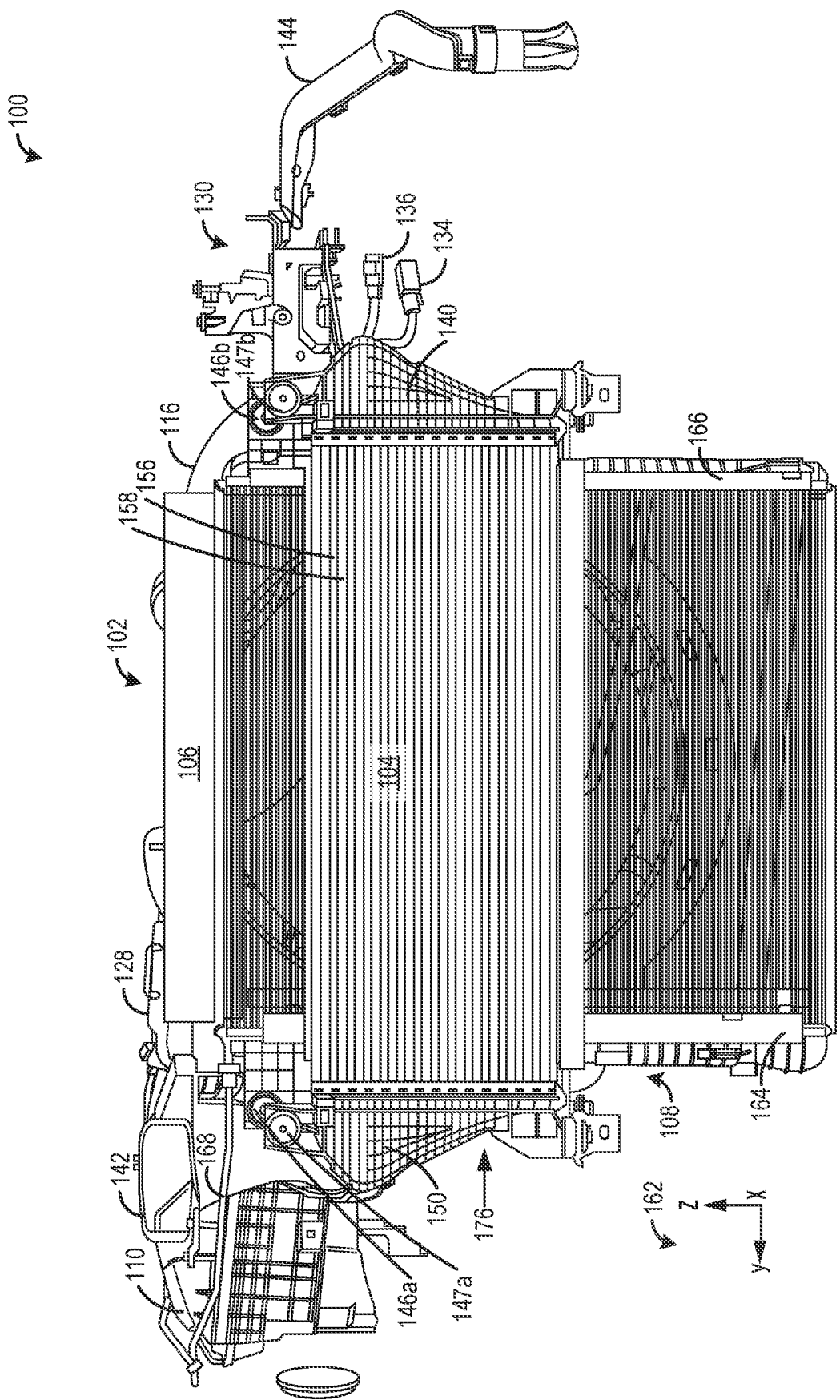

FIGS. 1A and 1B show isometric and front perspective views, respectively, of an embodiment of an engine system. The engine system may be utilized to warm a CAC to decrease the formation of ice. This may occur, for example, on surfaces of heat exchange passages within the charge air cooler when the surfaces are at a temperature less than the freezing point of the ambient air entering the CAC. FIGS. 1A and 1B are shown approximately to scale.

In the illustrated example of FIGS. 1A and 1B, an engine system 100 is depicted. The engine system 100 includes an engine 102, an engine coolant radiator 106, a CAC 104 arranged proximate the radiator, and an engine coolant radiator fan 108 captured between the radiator and the engine. In one embodiment, the engine 102 is a turbo charged engine coupled to a boosted air cooling path and an engine cooling loop of a vehicle (not shown). In one example, the vehicle may have a conventional internal combustion engine fueled by gasoline or diesel. In another example, the vehicle may be a hybrid vehicle with multiple sources of torque available for propulsion. The engine system may be controlled at least partially by a controller 170 (shown schematically), and by input from a vehicle operator (not shown). An axis system 162 is given in FIGS.

1A and 1B. The engine system is described in general with respect to FIG. 1A and common elements are similarly numbered in FIG. 1B.

In the isometric view of FIG. 1A, ambient air is introduced to the engine system 100 at intake passage 142 and is filtered in an airbox 110. An intake hose 114 coupled to the airbox 110 directs filtered air to a compressor (not shown) of the turbocharger system. The compressor may be a suitable intake-air compressor, such as a motor-driven or driveshaft driven supercharger compressor. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

The hot compressed air, e.g., boosted air, exiting the compressor through hose 154 enters the CAC 104 via CAC intake 150. The hose 154 is coupled to the CAC intake 150 by a coupler 152. In one example, the CAC may be an air-to-air heat exchanger, as shown in FIGS. 1A-1B. The CAC 104 may include a plurality of heat exchange passages 156 that run across the CAC along the y-axis. In some examples, the heat exchange passages may be formed from aluminum tubes. Boosted air direction of flow through the aluminum tubes is indicated by arrow 176. The heat exchange passages 156 provide a conduit for boosted air to be cooled by ambient cross-flow passing through a plurality of gaps 158 between the heat exchange passages 156. In an example, the ambient air flows between the gaps 158, perpendicular to the heat exchange passages, along the x-axis, which is indicated by an arrow 178. The ambient air passing over the aluminum tubes cools the surfaces of the heat exchange passages 156, cooling the boosted air flowing within the aluminum tubes. In another example, the CAC may be an air-to-liquid heat exchanger. A hose 116 is coupled to the CAC 104 by coupler 138. Cooled compressed air exiting the CAC 104 at CAC outlet 140 is directed to the engine air intake valve (not shown) via hose 116. The CAC 104 is coupled to the radiator 106 by a first and a second fastener 147a, 147b (e.g., bolt, washer).

Engine system 100 further includes a cooling system that circulates coolant through engine 102 to absorb waste heat and distributes the heated coolant to radiator 106 via a plurality of coolant lines including at least upper coolant lines 126, 128 and lower coolant line 129. In particular, FIG. 1A shows the radiator 106 positioned between and coupled to the radiator fan 108 and the CAC 104. The radiator fan 108 is on the interior (e.g., rear facing) of the radiator 106. The rear of the vehicle is indicated by arrow 180. The CAC 104 is on the exterior (e.g., front facing) side of the radiator 106. The front of the vehicle is indicated by arrow 180. The radiator 106 circulates engine coolant from engine 102 to radiator 106 via upper coolant lines 126, 128 and back to engine 102 via lower coolant line 129. In one example, an engine-driven water pump circulates coolant through passages in the engine block, head, etc., to absorb engine heat, which is then transferred via the radiator 106 to ambient air. A coolant reservoir 112 may collect and distribute (e.g., to the radiator) coolant via one more coolant lines 127. Coolant may be distributed to the radiator 106 via coolant line 168. An oil reservoir 118 may supply lubricant to the components of the engine system 100.

The radiator fan 108 may provide airflow assistance and augment an airflow through under-hood components. The radiator 106 is coupled to the radiator fan 108 by first and second fasteners 146a, 146b (e.g., bolt, washer). The radiator fan 108 may be operated when the vehicle is moving and the engine 102 is running to provide cooling airflow assistance across radiator 106. Radiator fan 108 may draw a cooling airflow into an under-hood compartment (not shown) through an opening at the front-end of the vehicle, for example, through a grille (not shown). In another example, the radiator fan may be operated when the vehicle is not moving, e.g., engine idling, engine off. In one example, the radiator fan 108 may rotate in a first direction of rotation or a second, reverse direction of rotation based on engine operating conditions. In one example, the radiator fan may rotate in a first direction of rotation (e.g., forward) when one or more conditions are met. The radiator fan may rotate in the second, reverse direction of rotation when one or more other conditions are met. As such, radiator fan 108 activation and operation mode (e.g., forward or reverse direction of rotation) may be based on ambient and operating conditions (e.g., ambient temperature, ambient humidity, engine temperature, transmission engagement status, engine speed) and associated thresholds. In one example, radiator fan 108 may be operated in the reverse direction of rotation, drawing airflow through the radiator 106 to blow heated air toward the CAC 104. In one example, radiator fan 108 may be operated in a reverse direction of rotation after operating in the forward direction in during the same vehicle operating cycle. A housing of radiator fan 108, referred to as air shrouds 109, channels airflow axially (e.g., indicated by arrow 178) to minimize radial airflow spread. In this way, more airflow produced by the operation of the radiator fan 108 is directed by the air shrouds 109 towards the intended engine component, such as the CAC 104 or the engine 102.

In one example, radiator fan 108 may be an electrically actuated engine cooling and CAC warming fan. For example, radiator fan activation and operation (e.g., direction of rotation, speed) may be controlled via an electrical input from an alternator 132 and a system battery 130. The controller 170 may command activation and/or a change in speed (e.g., rotational speed) of radiator fan 108 based on various ambient and engine conditions. In one example, the controller 170 may control the radiator fan 108 via an actuator 124. The system battery 130 may be coupled to a battery cable 144. The system battery 130 may provide electric power to components of engine 102 via wire 160. The wire 160 is in electronic communication with alternator 132. The electrical system includes a positive terminal wire 134 and negative terminal wire 136.

Radiator fan 108, when activated, may be capable of operation at different speeds and directions of rotation (e.g., polarity). For example, radiator fan 108 may include each of a lower speed setting and a higher (e.g., faster) speed setting, such that all blades of the radiator fan may spin or rotate collectively at a slower speed or a faster speed, respectively. The radiator fan may also be deactivated and its rotation may be stopped when surplus airflow is not desired and/or when the direction of rotation may be changed (e.g., forward, reverse). In alternate embodiments, radiator fan 108 may operate at a single speed irrespective of the direction of the rotation. It will be appreciated that though FIGS. 1A and 1B depict a single radiator fan 108, other example vehicles may include additional radiator fans (e.g., cooling fans coupled to the radiator).

The controller 170 may be communicatively coupled to various components of engine system 100 to carry out the control routines and actions described herein. For example, as shown in FIG. 1A, the controller 170 may be a microcomputer, including a processor 172 and memory 174, e.g., for executable programs and calibration values, one or more input/output ports, and a data bus. The controller 170 may receive input from a plurality of sensors, which may include user inputs and/or sensors (such as transmission gear position, gas pedal input, exhaust manifold temperature, air-fuel ratio, vehicle speed, engine speed, mass airflow through the engine, boost pressure, ambient temperature, ambient humidity, intake air temperature, etc.), cooling system sensors (such as coolant temperature, radiator fan speed, passenger compartment temperature, ambient humidity, etc.), charge air cooler sensors, coolant pump speed, and others. The controller may also send a plurality of control signals to various engine actuators (e.g., actuator 124 for control of the radiator fan 108) in order to adjust engine operation based on signals received from the sensors. For example, radiator fan rotation speed and/or direction may be controlled by the controller 170 responsive to one or more engine operating conditions and/or input from the one or more sensors, such as ambient temperature sensor 121, engine temperature sensor 122, and engine speed sensor 123. The speed and/or direction (e.g., operation mode) of the radiator fan may also be based on the conditions exceeding one or more thresholds, as described below in reference to FIG. 2A, FIG. 2B, and FIG. 3.

FIG. 1B shows a perspective view of the engine system 100. FIG. 1B shows CAC 104 coupled to the exterior facing side of the radiator 106 at fasteners 147a, 147b, positioning the CAC on the front end of the engine system. In one example, the CAC 104 is vertically smaller than the radiator 106. In another example, the CAC is spaced away from the radiator, with a space longitudinally between and fully separating the CAC 104 and the radiator 106. The radiator 106 is coupled to exterior facing (or vehicle front end facing) side of the radiator fan 108 at fasteners 146a, 146b, positioning the radiator between the CAC and the radiator fan. In one example, the radiator fan 108 is directly longitudinally behind the radiator 106. The engine 102 is behind the radiator fan 108. Fresh coolant is directed into a first radiator tube 164 of the radiator 106 via coolant line 168. A second radiator tube 166 collects spent coolant. Spent coolant is directed away from the radiator 106 via lower coolant line 129 (in FIG. 1A). Components of the electrical system are shown including system battery 130, positive terminal wire 134, negative terminal wire 136, and battery cable 144.

In one example, ambient air may enter at intake passage 142 and be directed into the turbocharger compressor for compression. Hot compressed air flows from the compressor entering the CAC 104 at CAC intake 150. The hot compressed air flows through the CAC 104 along the y-axis from left to right, as indicated by arrow 176, via the plurality of heat exchange passages 156, exiting the CAC 104 as cooled compressed air via CAC outlet 140. Cooled compressed air is directed to the air intake manifold (not shown) of the engine 102 via hose 116.

Condensate may form and accumulate in the CAC when the ambient air temperature decreases, and may freeze when the condensate cools below the water freezing point. Condensate may collect in the CAC, and then be drawn into the engine at once during acceleration (or tip-in) increasing the chance of engine misfire and reducing engine performance. Thus, as elaborated herein with reference to FIGS. 2A, 2B, and 3, under certain conditions the temperature at the CAC may be increased by adjusting the operation of the radiator fan such that frozen condensate formation and engine misfire events are reduced.

Figure 2A:
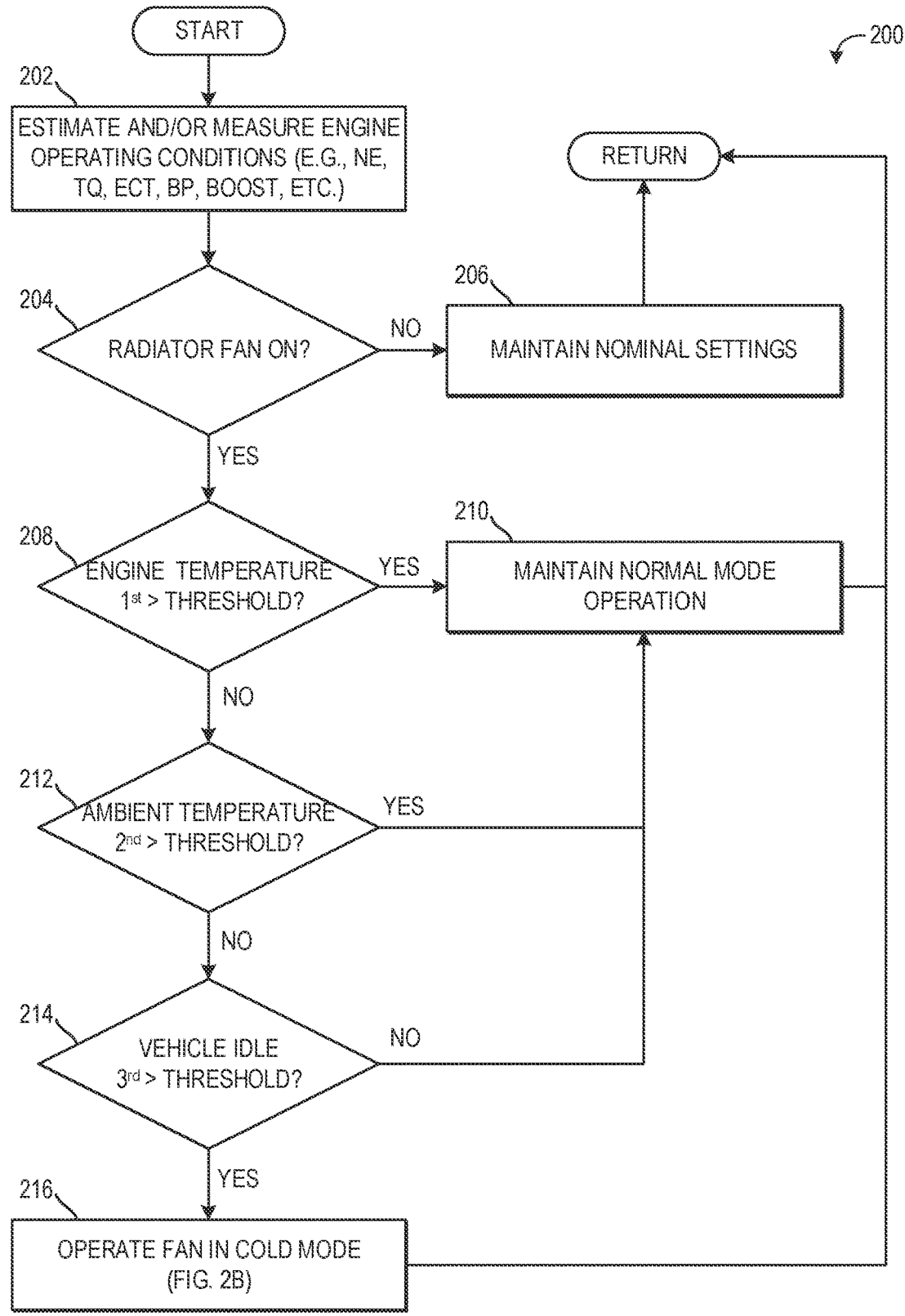
FIG. 2A shows a method for operating a radiator fan in a turbo charged engine system according to a first operation mode.
Figure 2B:
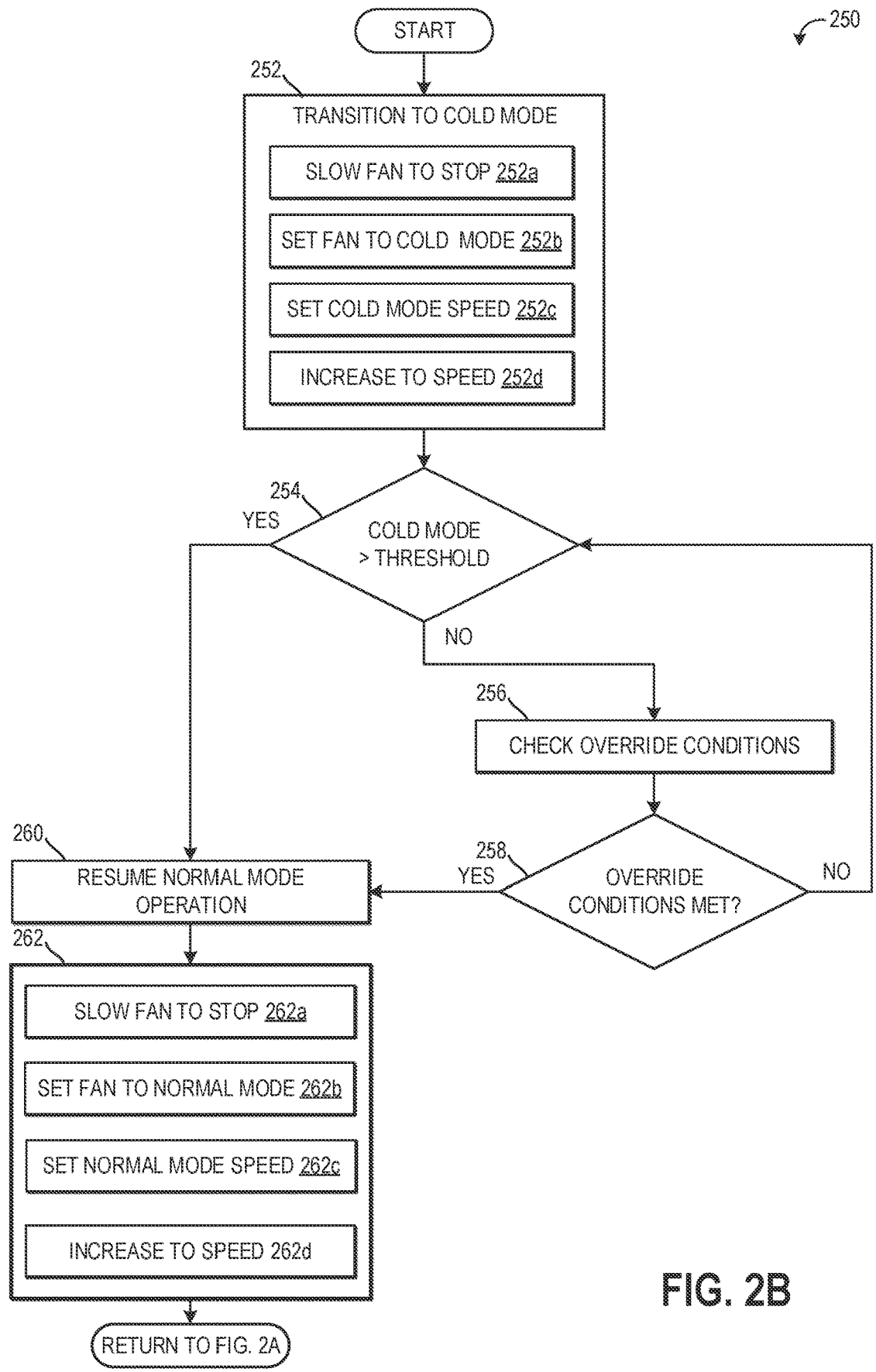
FIG. 2B shows a method for operating a radiator fan in a turbo charged engine system according to a second operation mode.

Now turning to FIG. 2A, an example method 200 is shown for adjusting operation of a radiator fan based on an engine temperature, an ambient temperature, and select engine idle conditions. The radiator fan may be included in an engine system such as the engine system 100 of FIGS. 1A-1B. In one example, the radiator fan may be adjusted from a first direction, e.g., a normal mode, to a second, reverse, direction, e.g., a cold mode, based on a determination of increased potential for ice formation in the CAC. In FIG. 2B, an example method 250 is shown for adjustment of the radiator fan following a determination to adjust the fan operation from the first direction to the second direction. Instructions for carrying out method 200 and the rest of the methods included herein may be executed by a controller based on instructions stored on a memory of the controller and in conjunction with signals received from sensors of the engine system, such as the sensors described above with reference to FIG. 1A. The controller may employ engine actuators of the engine system to adjust engine operation, according to the methods described below.

At 202, the method 200 includes estimating and/or measuring engine operating conditions. These include, for example, engine speed and load, transmission engagement status, torque demand, boost, manifold pressure (MAP), manifold aircharge temperature (MCT), air-fuel ratio (lambda), fuel alcohol content, barometric pressure, ambient conditions (e.g., ambient air temperature, pressure, humidity, etc.), engine pre-ignition history, etc.

At 204, the method 200 includes determining the status of the radiator fan, e.g., on or off. This may include the controller directly retrieving the status of the radiator fan, e.g., power supply of the radiator fan. The controller may operate the radiator fan during engagement of one or more gears of a transmission of the vehicle, in one example. In another example, the controller may operate the radiator fan if engine cooling is desired. In an example, a radiator fan powered on may operate in a normal mode as a default setting. In an example, the radiator fan operating in normal mode may include the fan blades rotating in an orientation to direct airflow toward the engine. In an example, the radiator fan operating in normal mode draws ambient air through the radiator to flow cooled air in the direction of the engine. In one example, normal radiator fan operation may include a preset and/or calibrated radiator fan speed (e.g., rotations per minute (RPM)). In another example, normal radiator fan operation may include a range of speeds based on engine temperature.

If it is determined that the radiator fan is not on, the method 200 may continue to 206. At 206, the method 200 includes maintaining nominal settings. In one example, operating at nominal conditions includes operating the engine at low speed-loads and low engine temperature, e.g., engine warm up.

Returning to 204, if it is determined that the radiator fan is on, the method 200 may continue to 208. At 208, the method 200 includes determining if the engine temperature is greater than a first threshold. In one example, the first threshold may be a preset non-zero temperature threshold. The controller may determine the engine temperature by a signal received from a sensor, such as the engine temperature sensor 122 of FIG. 1A, and compare the temperature to the first threshold. As one example, a first threshold may be a temperature within 5% of the optimal operating temperature, as determined by engine testing. If the engine temperature is above the first threshold, the method continues to 210.

At 210, the method 200 includes maintaining normal mode radiator fan operation. In an example, maintaining normal mode radiator fan operation may include making no adjustment from the normal mode setting of radiator fan operation, e.g., the direction of rotation to cool the engine of the vehicle. In another example, maintaining normal radiator fan operation may include maintaining the normal mode direction of rotation while allowing for adjustments to operation settings of that mode, such as adjusting the radiator fan speed based on engine operating conditions such as temperature.

Returning to 208, if the engine temperature is not above a threshold temperature, the method 200 continues to 212. At 212, the method includes determining if the ambient temperature is above a second threshold. In one example, the second threshold may be a preset non-zero temperature threshold that is different from the first threshold. In one example, the second threshold is set to an ambient temperature sufficiently warm to mitigate ice formation in the CAC.

The controller may determine the ambient temperature by a sensor, such as the ambient temperature sensor 121 of FIG. 1A, and compare the temperature to the second threshold, e.g., an ambient temperature threshold. In one example, the ambient temperature threshold may include an air temperature above the freezing point of water e.g., greater than 0° C. In other examples, additional or alternative ambient conditions may be included in the method, such as ambient humidity and/or other weather conditions. If the ambient temperature is above the second threshold, the method continues to 210 where normal fan operation is maintained as described above. If the ambient temperature is not above the second threshold, the method continues to 214.

At 214, the method includes determining whether an engine idle condition is present for greater than a third threshold. The third threshold may be a preset non-zero idle duration of time. In one example, prolonged idling may increase ice formation in the CAC by reducing the flow of hot compressed air from the turbocharger. In one example, the engine idle condition includes feedback controlling the idle speed to a set engine idle speed by adjusting engine output torque, such as through air and/or fuel and/or spark control. In an example, the engine may be transitioned into or out of idling based on various factors such as pedal position, braking, vehicle speed, and engine speed. In an example, the controller may control the vehicle in idle mode when the engine speed decreases below an idle threshold speed, e.g., as measured by the sensor 122 of FIG. 1A. In another example, the controller may exit the engine idle condition based on driver demanded torque. In one example, a duration of the engine idle condition may be compared to a preset non-zero engine idle duration threshold. In one example, the third threshold may be set based on a lookup table of ambient temperatures and associated idling durations. As an example, the idling threshold, e.g., third threshold may be set to 60 seconds at an ambient temperature of −5° C. In another example, the third threshold may be set to 20 seconds at an ambient temperature of −25° C. If it is determined that the vehicle is in the engine idle condition for less than the third threshold, the method continues to 210 to maintain normal mode fan operation. If it is determined that the vehicle is in the engine idle condition for greater than the third threshold, the method continues to 216.

At 216, the method includes operation of the radiator fan in a cold mode. In one example, operating the radiator fan in the cold mode may include reversing the normal direction of airflow to flow air ambient air warmed by the engine coolant radiator toward the CAC, e.g., CAC 104 of FIGS. 1A-1B. In one example, the radiator fan may be operated in a reverse direction of rotation after operating in the forward direction in during the same vehicle operating cycle. When operating, the radiator fan may direct air current in one orientation (e.g., forward, reverse). In one example, the radiator fan may flow air toward the engine (e.g., forward) or toward the CAC (e.g., reverse). Therefore, in one example, the decision to operate the radiator fan in the cold mode may be made by sequentially ruling out a first condition where the engine is too warm to reverse airflow, a second condition where the ambient temperature is sufficiently warm such that reversing the airflow is not demanded, or a third condition where the vehicle idles only briefly. In one example, the first, second and third conditions are the conditions described in steps 208, 212, and 214 of the method 200. In an example, an additional condition may include in response to increasing humidity in the CAC operating the radiator ran in a reversed direction. In this way, the decision to operate the radiator fan in the cold mode may be made based on whether the engine system can support a deviation from normal fan operation and whether there is an increased potential for ice formation. The adjustment of the fan to cold mode operation is described in FIG. 2B.

Turning to FIG. 2B, a method 250 for controlling the transition between radiator fan modes is described. The method begins at 252 where a transition to cold mode is described. It may be understood that an abrupt change from a first direction to a second direction may be undesirable for cooling system components. Thus, at 252, the method 250 includes four interim steps to transition the fan from operating in the normal mode to operating in the cold mode. First, at 252a, the radiator fan speed may be reduced to stop by tapering the fan speed to zero. In one example, the rate of radiator fan speed reduction may be a preset rate and/or a rate calibrated to bring the fan from a known speed to zero RPM. In one example, the radiator fan speed may be reduced at a preset rate for a preset duration. Next, at 252b, the radiator fan direction may be set to a cold mode. The cold mode fan orientation reverses the normal airflow of the radiator fan. In one example, the cold mode orients the fan to flow air in the direction towards the CAC. The radiator fan in cold mode draws ambient air through the radiator to direct warmed air in the direction of the CAC. The method then includes setting a new speed at 252c. In one example, a cold mode speed may be a rate of radiator fan rotation. In one example, the cold mode speed may be less than the normal mode speed, e.g., 50% of normal mode speed, and in another example, the cold mode speed may be the same as the normal mode speed. In one example, the cold mode speed may be determined based on the ambient conditions, e.g., faster speeds at colder ambient air temperatures. The method 250 then includes increasing the speed of the radiator fan to the new set speed at 252d. In one example, the fan speed may ramp up at a preset rate.

With the radiator fan operating in cold mode, the method 250 continues to 254. In one example, the method 250 includes maintaining operation of the reversed direction of rotation for a threshold duration. Thus, at 254, the method 250 includes determining whether the radiator fan operation in cold mode has been maintained for greater than a threshold duration. In one example, a threshold duration of time may be a preset non-zero duration of time. In one example, a threshold duration of time may be a fixed calibratable duration. In one example, the threshold duration of time may be variable and determined during operation based on signals received from an ambient temperature sensor, such as ambient temperature sensor 121 of FIG. 1A. In one example, a lookup table of ambient temperatures and associated durations to prevent ice formation based on engine testing may be accessed to determine the threshold duration. In one example, a threshold duration of time may be longer during colder ambient conditions. If it is determined that the radiator fan operation in cold mode has been maintained for greater than a threshold duration of time, the method continues to 260, where normal fan operation may be resumed.

In one example, normal fan operation may include the fan blades rotating in such a manner as to flow air in the direction of the engine, drawing ambient air into the engine compartment, past the radiator, to the engine block. In the normal mode, ambient air may be cooled by passing through the radiator. As described above, an abrupt change to the direction of airflow from the radiator may be undesirable for cooling system components. Thus, the method continues to 262 where a transition from cold mode to normal mode is included.

At 262, the method 250 includes four interim steps to transition the fan from operating in cold mode to operating in normal mode. At 262a, the rotational speed of the radiator fan may be slowed to stop, e.g., tapered to zero RPM. In one example, the rate of radiator fan speed reduction may be a preset and/or calibrated rate. In one example, the radiator fan speed may be reduced at a preset rate for a preset duration. At 262b, the radiator fan direction may be set to normal mode, restoring the normal, e.g., default, orientation of the radiator fan drawing ambient air through the radiator and directing cooled airflow toward the engine. At 262c, the method 250 includes setting a normal mode speed. In one example, a normal mode speed may be a rate of radiator fan rotation. In one example, the normal mode speed may be a preset and/or calibrated speed. In one example, there may be a single normal mode fan speed. In another example, the normal mode speed may be determined based on the ambient conditions, e.g., faster speeds at colder ambient air temperatures. In another example, the normal mode fan speed may be determined based on engine operating conditions, e.g., engine coolant temperature. At 262d, the method 250 includes increasing the speed of the radiator fan to the set speed. In one example, the fan speed may ramp up at a preset rate.

From 262 the method 250 may return to the method 200 of FIG. 2A, where the controller may continue to evaluate the engine system and ambient conditions with respect to radiator fan operation.

Returning to 254, if it is determined that the radiator fan operation in cold mode has been maintained for less than a threshold duration of time the method continues to 256. In one example, the method 250 includes terminating the maintaining operation of the radiator fan in cold mode in response to an override condition. Thus, at 256, the method includes the checking override conditions. In an example, there may be conditions where it is not advantageous to flow air in the direction of the CAC and away from the engine. As an example, override conditions may be thresholds, e.g., temperature thresholds, set for sensors that indicate of engine overheating. An override condition may include engine temperature, engine coolant temperature, and/or ambient temperature increasing above a threshold temperature, respectively.

At 258, the method includes determining whether one or more override conditions are met. Determining whether one or more override conditions are met may include receiving signals from one or more sensors, e.g., engine coolant sensor, engine temperature sensor, exhaust temperature sensor, and comparing the signal received to a corresponding threshold. If no override conditions are met, the method may return to 254. If one or more override conditions are met, the method continues to 260, where maintained operation of cold mode terminates and normal mode fan operation resumes.

In an example of the method, the radiator fan operation in cold mode may be maintained for a preset duration of time, as described above. In another example, the radiator fan operation in cold mode may be maintained for a duration based on signals received from one or more sensors of the engine system. For example, a CAC intake temperature sensor (e.g., positioned proximate the CAC intake 150 of FIGS. 1A-1B) may detect the temperature of the air entering the CAC. The CAC intake temperature sensor may signal to the controller to maintain cold mode fan operation until CAC intake temperature increases above a threshold temperature. In another example of the method, a CAC humidity sensor (e.g., positioned proximate the CAC outlet 140 of FIGS. 1A-1B) may detect the humidity of the air exiting the CAC intake passage. The CAC humidity sensor may signal to the controller to maintain the cold mode fan operation until the humidity increases above a threshold humidity indicating reduced likelihood of ice formation in the CAC.

Figure 3:
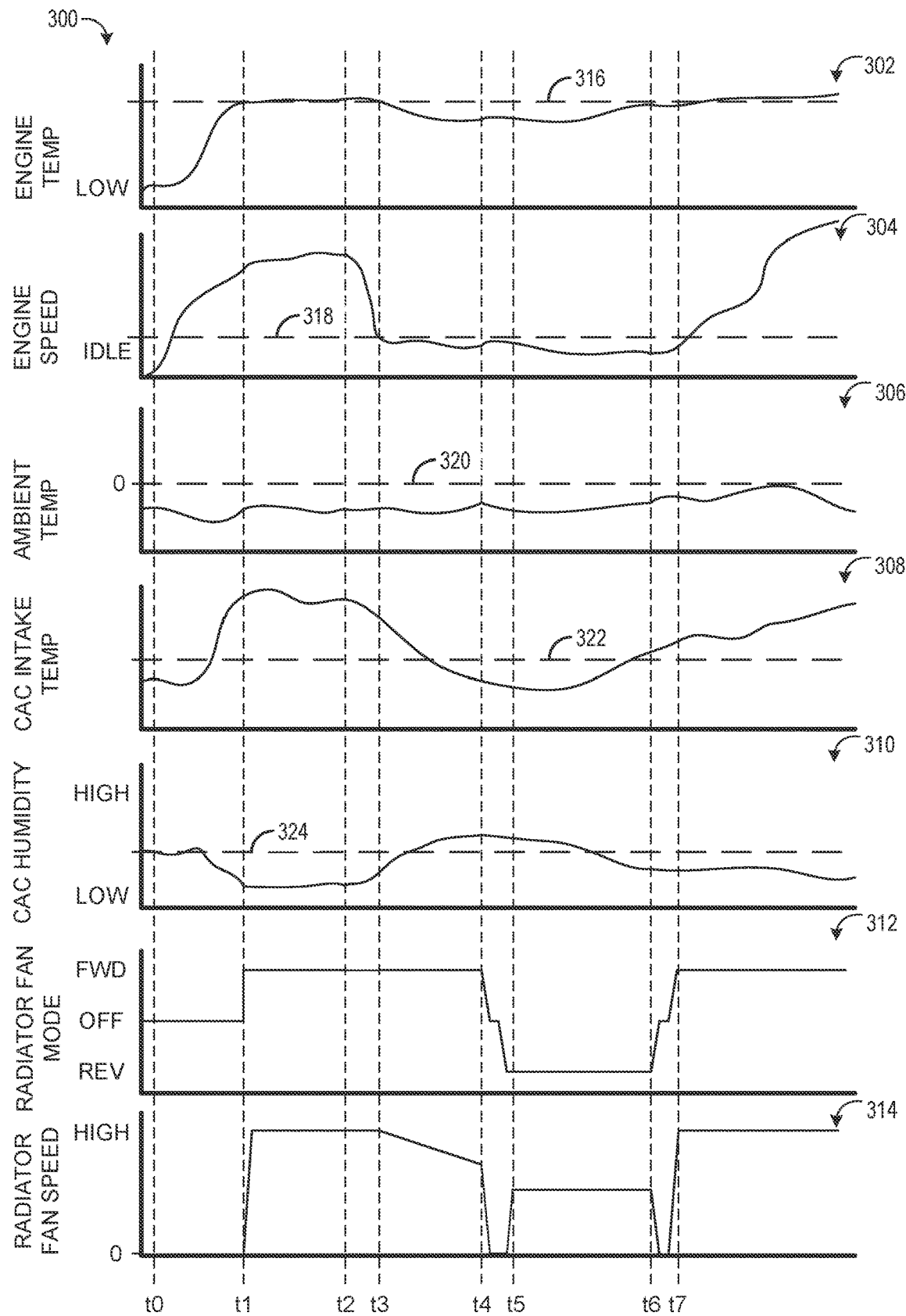
FIG. 3 shows a timing diagram for an example prophetic operation of a radiator fan in a turbo charged engine system.

FIG. 3 shows a timing diagram 300 for an example prophetic operation of a radiator fan in a turbo charged system, according to the method 200 of FIG. 2A and the method 250 of FIG. 2B. The timing diagram 300 illustrates an adjustment of the operation of a radiator fan to reduce the accumulation of frozen condensate in a CAC during cold ambient weather conditions based on an engine temperature condition, an ambient temperature condition, and an engine idle condition. The horizontal (x-axis) denotes time and the vertical markers t0-t7 identify relevant times in the methods of FIGS. 2A and 2B of the operation the radiator fan. As elaborated in timing diagram 300, an engine temperature is indicated at graph 302. In the example, the engine temperature is determined based on a signal received from an engine temperature sensor, such as engine temperature sensor 122 of FIG. 1A. An engine speed is indicated at graph 304. In the example, the controller may use feedback from an engine speed sensor, such as the engine speed sensor 123 of FIG. 1A to transition between and/or maintain a drive condition and an engine idle condition. At graph 306, an ambient temperature is indicated by ambient temperature sensor, such as the ambient temperature sensor of 121 of FIG. 1A. CAC intake temperature is indicated at graph 308, as measured by a CAC temperature sensor. CAC humidity is indicated at graph 310, as measured by a CAC humidity sensor. Radiator fan mode, e.g., forward, off, reverse, is indicated at graph 312. Radiator fan mode is determined by the engagement or disengagement of a radiator fan actuator, determined based on engine operating conditions and adjusted by the controller. The radiator fan actuator is engaged the forward direction when the radiator fan is in the normal mode. The radiator fan is engaged in the reverse direction when the radiator fan is in cold mode. The radiator fan is disengaged when the radiator fan is powered off. Graph 314 indicates a speed of radiator fan blade rotation, determined based on engine operating conditions and adjusted by the controller. The graphs 302, 304, 306, 308, 310, and 314 show an increase upwards along the y-axis.

Prior to t0, the engine is powered off. At t0, the engine is powered on. From period t0 to t1, the engine system warms and the driver requests increase torque by depressing an accelerator pedal. The engine system is operating in cold ambient conditions, such that for the duration of the example timing diagram 300, the ambient temperature remains below a temperature threshold 320. For example, the temperature threshold 320 is calibrated to the temperature where water freezes (e.g., 0° C.). Graph 302 shows engine temperature increasing toward the engine temperature threshold 316 between t0 and t1. For example, the engine temperature threshold is a lower limit of a desirable engine operating temperature range calibrated to the engine system (e.g., 90° C.). Graph 304 shows engine speed increasing as vehicle is operating in a drive condition. The CAC intake temperature increases above ambient temperature (e.g., a CAC temperature threshold 322) and the CAC humidity decreases below ambient humidity 324 as the engine system warms. Between t0 and t1, the radiator fan mode is off (e.g. radiator fan actuator disengaged, fan blade rotation speed zero) as engine temperature has not surpassed the engine temperature threshold 316.

At t1, in response to the engine temperature increasing above the engine temperature threshold 316 (graph 302), the radiator fan is operated in the forward (normal) mode (graph 312). The fan blade rotation speed (graph 314) ramps to high, e.g., 1200 RPM. In response to the fan operation in normal mode, the CAC humidity declines following t1 and stabilizes from t1-t2. Also from t1-t2, the CAC intake temperature (graph 308) remains relatively stable from t1-t2 due to the warming effect of the engine. The engine temperature (graph 302) remains relatively stable from t1-t2 due to the cooling effect of the radiator fan operating in normal mode. From t2-t3, the engine speed reduces in response to a decrease in demand for torque and approaches an engine idle condition threshold 318. For example, the engine idle condition threshold is 600 RPM. As engine speed decreases, engine temperature (graph 302) conditions remain relatively stable and the radiator fan operation is maintained in the forward mode (graph 312). CAC intake temperature (graph 308) declines and CAC humidity (graph 310) increases as the turbo speed ramps down, reducing heating of compressed air to the CAC intake.

At t3, the engine speed drops below the idle condition threshold 318, indicating control of the vehicle in the engine idling condition. An engine idling condition threshold duration of time extends between t3-t4. Between t3-t4, in response to the engine idling, the engine temperature (graph 302) decreases below the engine temperature threshold (e.g., 190° C.). In response to the reduction of compressed air flowing from the compressor into the CAC, the CAC intake temperature decreases below the threshold 322 and the CAC humidity increases above ambient humidity 324. As the timeline approaches t4, the ambient and engine operating conditions are conducive to the formation of ice.

At t4, the vehicle has idled for greater than the threshold duration of time. In response to the vehicle having been in the engine idle condition (e.g., below the idle condition threshold 318) for greater than the threshold duration of time, the controller adjusts the radiator fan operation to cold mode. From t4 to t5, the adjustment of the radiator fan is made according to the method 250. Radiator speed (graph 314) is reduced to zero. With radiator speed at zero, the radiator fan mode (graph 312) is first disengaged to off and then engaged into reverse. The radiator fan rotation speed ramps to a cold mode fan speed. In this example, an ambient temperature at 0° C. sets the cold mode fan speed to 600 RPM, or approximately half the speed of the normal mode.

At t5, the radiator fan operates in cold mode drawing ambient air through the radiator. From t5-t6, the air warms as it passes through the radiator, raising the temperature of the CAC (graph 308) and reducing the formation of ice. The humidity of the CAC (graph 310) decreases as the CAC is warmed. In this example, the radiator fan operates in cold mode for a preset threshold duration of time (t5-t6). While the radiator fan operates in cold mode, the controller may check override conditions. For example, with the airflow from the radiator fan directed away from the engine, the engine temperature (graph 302) increases, but remains below the engine temperature threshold 316 for the duration of t5-t6.

At t6, the radiator fan has operated in the cold mode for the threshold duration of time. In response, the controller adjusts the radiator fan operation to normal mode. From t6-t7, the adjustment of the radiator fan is made according to the method 250 of FIG. 2B. Radiator fan speed (graph 314) is reduced to zero. With radiator fan speed at zero, the radiator fan mode (graph 312) is first disengaged to off and then engaged in forward. The radiator fan speed ramps to the normal mode set speed, which in this example is high (e.g., 1200 RPM).

At t7, the radiator fan is operating in normal mode. Also at t7, the driver increases vehicle speed, resulting in the engine speed rising above the idle condition threshold 318, indicating the vehicle operating in the drive condition. In the drive condition, the CAC intake temperature increases and the CAC humidity decreases as the turbo charger spools and feeds warm compressed air to the CAC.

In this way, radiator fan operations may be controlled in response to engine operating conditions and ambient conditions. By adjusting the radiator fan operation based on engagement of one or more gears of the transmission, engine temperature, ambient temperature, and vehicle idling, an engine cooling system may cool or warm components of the vehicle system. Adjusting an operation of a radiator fan in this way allows for adequate engine cooling during driving operations, while reducing condensate ice formation in a CAC during engine idle. For example, the condensate is reduced because the CAC may be maintained sufficiently warm to prevent condensate formation without or with the use of active grille shutters or permanent CAC blockers additional robustness during drive cycles with extended periods of idle. The technical effect of reducing condensate ice formation in the CAC is that engine performance may be enhanced during cold ambient conditions.

FIGS. 1A and 1B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a method for a vehicle, comprising: operating a radiator fan of the vehicle in a first direction to cool an engine of the vehicle, and reversing a direction of rotation of the radiator fan to blow heated air to a charge air cooler of the vehicle, the charge air cooler arranged proximate to a radiator of the vehicle. In a first example of the method, the operating of the radiator fan in the first direction is during engagement of one or more gears of a transmission of the vehicle. In a second example of the method, optionally including the first example, the method further comprises maintaining operation of the reversed direction of rotation for a threshold duration. In a third example of the method, optionally including one or both of the first and second examples, the threshold duration is a duration of time. In a fourth example of the method, optionally including one or more or each of the first through third examples, reversing the direction is in response to an engine idle condition being present for greater than a non-zero idle duration. In a fifth example of the method, optionally including one or more or each of the first through fourth examples, reversing the direction is in response to engine temperature less than an engine temperature threshold. In a sixth example of the method, optionally including one or more or each of the first through fifth examples, reversing the direction is in response to ambient temperature less than an ambient temperature threshold. In a seventh example of the method, optionally including one or more or each of the first through sixth examples, reversing the direction is in response to the radiator fan operating in the first direction. In an eighth example of the method, optionally including one or more or each of the first through seventh examples, the method further comprises terminating the maintaining operation in response to an override condition. In a ninth example of the method, optionally including one or more or each of the first through eighth examples, reversing the direction is in response to increasing humidity.

The disclosure also provides support for a method for operating a vehicle, comprising: operating a radiator fan of the vehicle in a first direction to cool an engine of the vehicle, the radiator positioned between the engine and a charge air cooler, and operating the radiator fan of the vehicle in a second, reverse, direction to blow heated air to the charge air cooler of the vehicle in response to an idle condition where an increased potential for ice formation is determined. In a first example of the method, determining an increased potential for ice formation is based on an engine temperature, an ambient air temperature, and an engine idle condition. In a second example of the method, optionally including the first example, the method further comprises: transitioning between operating the radiator fan of the vehicle in the first direction and the second direction, the transitioning including reducing a speed of the radiator fan to zero, setting a direction of rotation of the radiator fan, setting a new speed of the radiator fan, and increasing the speed of the radiator fan to the new set speed.

The disclosure also provides support for a system for a vehicle, comprising: a turbocharger, a cooling system having a temperature sensor, a charge air cooler positioned at a front end of the vehicle, the charge air cooler coupled to the turbocharger, a radiator fan, and a radiator positioned between the charge air cooler and the radiator fan, a controller having instructions stored therein that, when executed, cause the controller to operate the radiator fan in a first direction to cool an engine of the vehicle in response to the temperature sensor, and reverse a direction of rotation of the radiator fan to a second direction to blow heated air to the charge air cooler of the vehicle in response to select engine idle conditions. In a first example of the system, the controller further includes instructions to maintain operation of the second direction of rotation for a threshold duration. In a second example of the system, optionally including the first example, the select engine idle conditions include engine idle during ambient temperature less than an ambient temperature threshold. In a third example of the system, optionally including one or both of the first and second examples, the controller further includes instructions for terminating the maintained operation in response to an override condition. In a fourth example of the system, optionally including one or more or each of the first through third examples, the charge air cooler is vertically smaller than the radiator. In a fifth example of the system, optionally including one or more or each of the first through fourth examples, the charge air cooler is spaced away from the radiator, with a space longitudinally between and fully separating the charge air cooler and the radiator. In a sixth example of the system, optionally including one or more or each of the first through fifth examples, the radiator fan is directly longitudinally behind the radiator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed four, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein. As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
operating a radiator fan of the vehicle in a first direction to cool an engine of the vehicle, and reversing a direction of rotation of the radiator fan to blow heated air to a charge air cooler of the vehicle, the charge air cooler arranged proximate to a radiator of the vehicle, wherein the operating of the radiator fan in the first direction is during engagement of one or more gears of a transmission of the vehicle.

2. The method of claim 1, further comprising maintaining operation of the reversed direction of rotation for a threshold duration.

3. The method of claim 2, further comprising terminating the maintaining operation in response to an override condition.

4. The method of claim 2, wherein the threshold duration is a duration of time.

5. The method of claim 1, wherein reversing the direction is in response to an engine idle condition being present for greater than a non-zero idle duration.

6. The method of claim 1, wherein reversing the direction is in response to engine temperature less than an engine temperature threshold.

7. The method of claim 1, wherein reversing the direction is in response to ambient temperature less than an ambient temperature threshold.

8. The method of claim 1, wherein reversing the direction is in response to the radiator fan operating in the first direction.

9. The method of claim 1, wherein reversing the direction is in response to increasing humidity.

10. A method for operating a vehicle, comprising:
operating a radiator fan of the vehicle in a first direction to cool an engine of the vehicle, the radiator positioned between the engine and a charge air cooler, and operating the radiator fan of the vehicle in a second, reverse, direction to blow heated air to the charge air cooler of the vehicle in response to an idle condition where an increased potential for ice formation is determined,
wherein determining an increased potential for ice formation is based on an engine temperature, an ambient air temperature, and an engine idle condition.

11. The method of claim 10, further comprising transitioning between operating the radiator fan of the vehicle in the first direction and the second direction, the transitioning including reducing a speed of the radiator fan to zero, setting a direction of rotation of the radiator fan, setting a new speed of the radiator fan, and increasing the speed of the radiator fan to the new set speed.

12. A system for a vehicle, comprising:
a turbocharger;
a cooling system having a temperature sensor, a charge air cooler positioned at a front end of the vehicle, the charge air cooler coupled to the turbocharger, a radiator fan, and a radiator positioned between the charge air cooler and the radiator fan;
a controller having instructions stored therein that, when executed, cause the controller to operate the radiator fan in a first direction to cool an engine of the vehicle in response to the temperature sensor, and reverse a direction of rotation of the radiator fan to a second direction to blow heated air to the charge air cooler of the vehicle in response to select engine idle conditions.

13. The system of claim 12, wherein the controller further includes instructions to maintain operation of the second direction of rotation for a threshold duration.

14. The system of claim 13, wherein the select engine idle conditions include engine idle during ambient temperature less than an ambient temperature threshold.

15. The system of claim 13, wherein the controller further includes instructions for terminating the maintained operation in response to an override condition.

16. The system of claim 13, wherein the charge air cooler is vertically smaller than the radiator.

17. The system of claim 16, wherein the charge air cooler is spaced away from the radiator, with a space longitudinally between and fully separating the charge air cooler and the radiator.

18. The system of claim 17, wherein the radiator fan is directly longitudinally behind the radiator.

* * * * *